| United States Patent [19] | [11] 4,023,961 |
|---|---|
| Douglas et al. | [45] May 17, 1977 |

[54] METHOD OF PRODUCING POWDERED MATERIALS

[75] Inventors: Peter Douglas, Weedon; Thomas Ian Stewart, Kingsthorpe, both of England

[73] Assignee: Plessey Incorporated, Melville, N.Y.

[22] Filed: Feb. 12, 1975

[21] Appl. No.: 549,279

[30] Foreign Application Priority Data

Apr. 11, 1974 United Kingdom ............ 16103/74
Oct. 31, 1974 United Kingdom ............ 47093/74

[52] U.S. Cl. .............................. 75/.5 AC; 75/.5 C; 75/.5 BC
[51] Int. Cl.² ...................... C22B 11/04; B22F 9/00
[58] Field of Search ............ 75/.5 A, .5 AB, .5 AA, 75/.5 AC, .5 B, .5 C

[56] References Cited

UNITED STATES PATENTS

| | | | |
|---|---|---|---|
| 3,172,753 | 3/1965 | Walsh ............................... | 75/.5 AC |
| 3,305,349 | 2/1967 | Bovarnick et al. ............... | 75/.5 AA |
| 3,415,640 | 12/1968 | Lambert .......................... | 75/.5 AC |
| 3,677,975 | 7/1972 | Bennett et al. ..................... | 75/.5 B |
| 3,820,979 | 6/1974 | Manassen .......................... | 75/.5 A |
| 3,885,955 | 5/1975 | Lutz et al. .......................... | 75/.5 A |

*Primary Examiner*—W. Stallard
*Attorney, Agent, or Firm*—Fleit & Jacobson

[57] ABSTRACT

A method of producing powdered material which includes the steps of providing at least one metal or its oxide in the form of a solution; forming the solution into an atomized spray; and reacting the atomized solution to produce a metal or metal oxide powder having a particle size which is determined by the composition of the solution in relation to the size of the individual droplets of the atomized spray.

40 Claims, No Drawings

METHOD OF PRODUCING POWDERED MATERIALS

The invention relates to a method of producing powdered materials which have a particular but not necessarily an exclusive application in the fabrication of electrical contacts and/or in the formulations of pastes and inks for use in screen printing or related techniques.

The quality of a composite material whose composition includes at least one metal such as silver and at least one metal oxide such as cadmium oxide depends on the distribution of the said at least one metal oxide throughout the said at least one metal. For the best quality material, the distribution of the said at least one metal oxide throughout the said at least one metal should be as intimate and uniform as possible. It is known that the nature of the cadmium oxide distribution in silver-cadmium oxide electrical contact materials critically influences the performance of contacts made from this material and in order to ensure an improved performance from electrical contacts of this type, it is necessary to have a fine, even dispersion of the oxide phase throughout the silver matrix. Both conventional powder metallurgy and conventional internal oxidation of silver-cadmium alloys are unsatisfactory in achieving a desired microstructure for the electrical contacts.

Screen printing is a well known technique for applying conducting layer patterns onto insulating ceramic substrates for use in the field of electronics. There are other well known related printing techniques such as ink-dotting and the application of more resistive layers in applications where a particular resistivity rather than good electrical conductivity is required. Screening pastes and inks for use in these printing techniques are also well known and the conducting pastes that are used are generally composed of a mixture of a conducting metal powder such as gold, silver, silver-palladium or platinum for providing the necessary electrical conducting properties for the paste, glass and metal oxide powder for providing the necessary adhesion properties for the paste and a resin dissolved in a suitable solvent with an oil-based carrier for binding the powders together to form the paste and for providing the necessary screening and dotting characteristics for the paste. In resistor pastes a metal oxide powder such as ruthenium oxide is used in place of the conducting metal powder constituent. The properties that the screening pastes and inks must exhibit include (a) ease of application, (b) the provision of a continuous thick film of very low electrical resistance or of controlled resistivity i.e. the active metal powder constituent must sinter together to provide a continuous conducting path, and (c) the provision of good adhesion to the substrate and in the case of conducting pastes, good solderability. Two of the most important factors which influence these properties are the particle morphology and size distribution of the conductor or resistor powders.

The invention provides a method of producing powdered material which includes the steps of providing at least one metal or its oxide in the form of a solution; forming the solution into an atomised spray; and reacting the atomised solution to produce a metal or metal oxide powder having a particle size which is determined by the composition of the solution in relation to the size of the individual droplets of the atomised spray.

According to a feature of the invention a method as outlined in the preceding paragraphs is provided which includes, prior to the formation of the atomised spray, the additional steps of providing at least one metal oxide in the form of a solution; and intimately mixing the solution of the said at least one metal oxide with the solution of the said at least one metal or its oxide, the material produced as a result of reacting the atomised mixed solution being a metal/metal oxide or a metal oxide/metal oxide composite in powder form.

The reaction can be effected either thermally and/or chemically. The particle size distribution of the atomised solution droplets is a function of the spray parameters. Control of the atomised solution droplet size and concentration and control of the decomposing solution concentration or decomposition temperature can be used to produce powders of the desired characteristics.

Typical powdered materials that can be produced by the methods according to the invention are silver, gold, silver-palladium, palladium, platinum, any combination of these metals, cadmium oxide, tin oxide, zinc oxide, ruthenium oxide, cobalt oxide, copper oxide, indium oxide, tantalum oxide, tungsten oxide, lanthanum oxide, strontium oxide, chromium oxide, iron oxide, magnesium oxide, manganese oxide, calcium oxide, barium oxide, tellurium oxide and lithium oxide. Alternatively, a composite powdered material can consist of at least one of the listed metals and at least one of the listed oxides or at least two of the listed oxides.

The foregoing and other features according to the invention will be better understood from the following description of specific embodiments of the invention.

In the method according to the invention a powdered material having a particular but not necessarily an exclusive application in the fabrication of electrical contact and/or in the formulations of pastes and inks for use in screen printing or related techniques, is produced by providing a solution of the constituent material or materials of a desired composition, forming the solution into an atomised spray having droplets of controlled size and then finally reacting the individual solution droplets to produce a powdered material having a powder particle size which is determined by the solution composition in relation to the mean size of the individual droplets of the atomised spray.

Typical powdered materials that can be produced by the method according to the invention are outlined in a preceding paragraph.

The formation of the individual droplets can be effected by forming an atomised spray of the solution using, for example, a rotating disc atomiser, an aerosol spray or an annular two fluid atomiser. The size of the individual droplets of the atomised spray can be in the range $<1$ $\mu$m to $<100$ $\mu$m.

With a thermal reaction the atomised spray can be projected through a gas flame, for example an oxy-propane flame, in order to effect decomposition of the individual droplets. The powder produced by this method is collected in a liquid medium, for example, water.

In the production of a gold powder by the method according to the invention, the gold solution can be provided by (a) gold metal dissolved in aqua regia, or (b) chloroauric acid ($HAuCl_4$) dissolved in water, or (c) gold chloride or cyanoauric acid dissolved in aqueous or organic solvents.

In the production of gold powder by the flame spraying technique, the gold solution could be provided by a solution of $HAuCl_4$ which is stable and soluble in water and which has a relatively low decomposition temperature.

The atomised spray of the gold solution can be sprayed into a reducing agent such as ferrous sulphate, hydroquinone or oxalic acid, or into a hot organic liquid medium such as glycerol, dibutyl phthalate, tetraethylene glycol or ethyl pentachloro benzene, which is being maintained at a temperature higher than the decomposition temperature of the solution. By varying the temperature of the hot organic liquid medium, powders having differently shaped particles may be produced. For example, with a glycerol liquid medium, smooth spheres will be obtained at a temperature of 210 to 220° C whereas a mixture of smooth spheres, and hexagonal and triangular platelets will be obtained at a temperature of about 170° C.

In general, a gold powder can be produced by spraying a gold solution containing up to 1130 gm of gold (Au) per liter of solution into a reducing agent such as, for example, (a) a solution containing 100 to 200 gm of ferrous sulphate ($FeSO_4$) per liter of solution, the ferrous sulphate solution being maintained at a temperature of 10 to 50° C and a pH value of 1 to 6, or (b) a solution containing 100 gm of hydroquinone per liter of solution, the hydroquinone being maintained at a temperature of about 90° C, or (c) a solution containing 250 gm of oxalic acid per liter of solution, the oxalic acid being maintained at a temperature of about 90° C.

In one example of the production method which uses a ferrous sulphate reducing agent, a solution of $HAuCl_4$ containing 68 gm of $HAuCl_4$ per liter of solution, i.e. 34 gm of gold (Au) per liter of solution, is sprayed into a solution containing 100 gm of $FeSO_4$ per liter of solution. The $FeSO_4$ solution is maintained at a temperature of about 15° C and a pH value of 4.5, and the $HAuCl_4$ solution is sprayed into the $FeSO_4$ solution at a gas pressure of about 2 pounds per square inch using about 6 liters per minute of a nitrogen ($N_2$) carrier gas. The chemical reaction which occurs as a result of this step is as follows:

The atomised droplets of the sprayed $HAuCl_4$ solution would have a geometric mean diameter of about 14 microns.

The resulting powder is then washed firstly with hydrochloric acid and then with water, and the washed powder is then dried to provide gold powder having powder particles in the form of slightly rough spheres and a geometric mean diameter of about 0.7 microns. The size of the gold powder particles produced by this method under fixed conditions gave a linear relationship between the log radius of the powder particles (geometric mean) and 1/3 log gold concentration thereby enabling a powder of a predetermined size to be produced.

When a solution of $HAuCl_4$ is sprayed into a solution of hydroquinone maintained at a temperature of about 90° C in order to produce a gold powder, the chemical reaction which occurs is as follows:

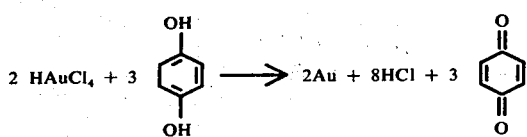

When a gold powder is produced by spraying a solution of $HAuCl_4$ into a solution of oxalic acid maintained at a temperature of about 90° C then the following chemical reaction occurs:

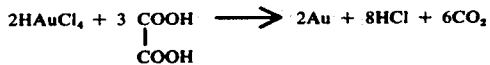

In an example of a production method for gold powder which uses a glycerol liquid medium maintained at a temperature higher than the decomposition temperature of the solution, a solution of $HAuCl_4$ containing 80 gm of $HAuCl_4$ per liter of solution, i.e. 40 gm of Au per liter of solution, is sprayed into the glycerol at a gas pressure of about 1.5 pounds per square inch using about 10 liters per minute of $N_2$. The glycerol is maintained at a temperature in the range 210° to 220° C. Under these conditions the sprayed droplets had a geometric mean diameter of about 15 microns and the resulting gold powder particles were in the form of smooth spheres having a geometric means diameter of about 0.3 microns.

In another example of a production method for gold powder which uses a glycerol liquid medium, a solution of $HAuCl_4$ containing 2,200 gm of $HAuCl_4$ per liter of solution, i.e. 1,130 gm of Au per liter of solution is sprayed into the glycerol at a gas pressure of about 1.0 pounds per square inch using about 3.2 liters per minute of $N_2$. The glycerol is maintained at a temperature of about 170° C. Under these conditions the sprayed droplets had a geometric mean diameter of about 15 microns and the resulting gold powder particles consisted of a mixture of faceted spheres having a geometric mean diameter of 4.5 μm, and triangular and hexagonal platelets, the approximate composition being 50% spheres and 50% platelets.

In the production of silver powder by the method according to the invention, the silver solution can be provided by silver nitrate and the reducing agent can be provided by a solution of ammonium formate containing an excess of formic acid. The size of the silver powder particles produced by this method is determined by the silver nitrate concentration and the droplet radius and there is a linear relationship between the log radius of the powder particles and ⅓ log silver concentration.

In one example of a method of producing silver powder, silver nitrate solution containing 301.6 gm of silver per liter of solution is sprayed into an ammonium formate solution which was prepared by mixing 240 ccs of ammonium hydroxide (0.88 gm per cc), 196 ccs of formic acid and 564 ccs of distilled water. The geometric mean diameter of the sprayed droplets is about 20 μm and the resulting silver powder particles were in the form of smooth spheres having a geometric mean diameter of about 0.64 μm. the chemical reaction which occurs as a result of this method is as follows:

In the production of palladium powder by the method according to the invention, the palladium solution can be provided by either (a) palladium metal dissolved in aqua regia, or (b) palladium chloride ($PdCl_2$) dissolved in water, and the reducing agent can be a solution of a reducing agent such as hydroquinone or formic acid. The size of the palladium powder particles is determined by the concentration of the sprayed solution and the droplet radius.

Thus, in one example of a method of producing palladium powder, a solution of 247 gm per liter of palladium prepared by dissolving palladium metal in aqua regia is sprayed into a solution of 100 gm per liter of hydroquinone which is being maintained at a temperature of about 90° C. The geometric mean diameter of the sprayed droplets is about 20μm and the resulting palladium powder particles are spherical in shape and have a geometric mean diameter of about 0.2 μm.

In an alternative method of producing palladium powder, the palladium solution can be provided by a palladium nitrate solution and the reducing agent can be ammonium formate. The chemical reaction which occurs as a result of this method is as follows:

Pd(NO₃)₂ + 2HCOONH₄ → Pd+ CO₂ + 2NH₄NO₃ + HCOOH.

When a palladium powder is produced by spraying a solution of palladium chloride (PdCl₂) into a solution of hydroquinone maintained at a temperature of about 90° C then the following chemical reaction occurs:

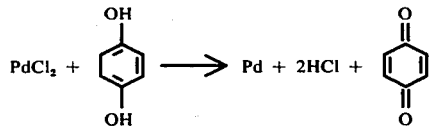

When a solution of palladium chloride is sprayed into a solution of formic acid maintained at a temperature of about 90° C in order to produce a palladium powder, the following chemical reaction occurs:

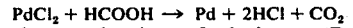

PdCl₂ + HCOOH → Pd + 2HCl + CO₂

In the production of platinum (Pt) powder by the method according to the invention, the platinum solution can be provided by platinum metal dissolved in aqua regia and the reducing agent can be hot formic acid. The chemical reaction which occurs as a result of this method is as follows:

H₂[PtCl₆] +2HCOOH → Pt +6HCl +2CO₂

In an alternative method of producing a metal or metal oxide powder, the solution of the metal or metal oxide can be simultaneously formed into individual droplets and decomposed to produce the powder by spraying a reducing agent such as ferrous sulphate into the metal or metal oxide solution.

In the production of a powdered material containing at least two metals, for example Pd/Au, Pt/Au, Pd/Ag, and Pd/Au/Pt, combined in any desired proportions, a solution containing the desired metals is sprayed into a suitable reducing agent.

Thus, in the production of a Pd/Au or a Pt/Au powder, the two metals are dissolved in the desired proportions in aqua regia and the solution is sprayed into a solution of either (a) hydroquinone maintained at a temperature of about 90° C, or (b) formic acid maintained at a temperature of about 90° C. For example, in the production of a Pd/Au powder containing 70 weight percent of gold and 30 weight percent of palladium, a solution containing 70 gm of Au per liter of solution and 30 gm of Pd per liter of solution is prepared by dissolving the two metals in aqua regia and then spraying the solution into a hydroquinone solution maintained at a temperature of about 90° C. The resulting powder particles were spherical, had a mean diameter of 0.4 μm and contained Au and Pd in the ratio 70:30.

A Ag/Pd powder is produced by dissolving the desired amount of palladium metal in nitric acid, adding silver nitrate and distilled water to give a solution of the desired composition, and spraying the mixed solution into a solution a ammonium formate. For example, a solution of 50 gm per liter of Pd and 70 gm per liter of Ag, when sprayed into a solution of 240 ccs of NH₄OH/176 ccs of HCOOH per liter which is being maintained at a temperature of 20° C resulted in the production of a powder containing 40 weight percent of palladium and 60 weight percent of silver.

A Pd/Pt/Au powder can be produced by the method outlined in a preceding paragraph for the Pd/Au and the Pt/Au powders.

In the production of a composite powdered material by the method according to the invention a slurry of metal or metal oxide is sprayed into a suitable metal salt solution, for example in the production of a composite of 75 weight percent of Au and 25 weight percent of W, a solution containing 150 gm of Au per liter of solution was slurried with 50 gm per liter of tungsten powder having a powder particle size of <0.04 μm and the resulting slurry was then sprayed into a solution containing 100 gm per liter of hydroquinone maintained at a temperature of about 90° C.

It is possible to change the composition of the resulting powder by changing the amount of tungsten powder that is slurried in the gold solution.

Other composite powders which can be produced by the method outlined in the preceding paragraph are Ag/Au; a slurry of silver powder and a gold solution being sprayed into a solution of hydroquinone, and Ni/Au from a slurry of nickel powder and a HAuCl₄ solution.

In another method of producing a composite material by the method according to the invention, a nitrate solution of each of the constituent materials is provided and the nitrate solutions are then mixed together in the desired proportion. The mixed nitrate solution is then formed into an atomised spray in a manner as previously outlined to produce mixed nitrate solution droplets of controlled size. The individual droplets are then subjected to a chemical reaction by spraying the mixed nitrate solution into a precipitating medium to produce a composite material in powder form, the powder particle size being determined by the composition of the mixed nitrate solution in relation to the mean size of the individual droplets of the atomised spray. The precipitate of this chemical reaction is then subjected to various filtering, washing and firing operations to produce a powdered composite material of a desired purity.

In the production of a powdered composite material of silver and at least one metal oxide, the mixed nitrate solution consists of silver nitrate to a maximum concentration of 712 grams per liter of solution, and the nitrate of the metal oxide i.e. for a Ag/CdO composite material, the solution would consist of a mixture of silver nitrate and cadmium nitrate, and for a Ag/CdO/Li₂O composite material, the solution would consist of a mixture of silver nitrate, cadmium nitrate and lithium nitrate.

The relative concentrations of the nitrates may be varied in order to produce a powdered material of a desired final powder composition, the range of concentrations in the case of silver based materials being from 712 gm per liter of AgNO$_3$ to give pure silver powder up to 66 gms per liter of AgNO$_3$+ 43 gm per liter of Cd(NO$_3$)$_2$ 4H$_2$O to give a composite powdered material of Ag -50 weight percent CdO.

Variation of the solution concentration whilst maintaining the same metal/metal oxide ratio will effect a variation in the size of the powder particles of the resulting composite material.

Thus composite materials such as Ag/CdO, AgZnO, Ag/MgO, Ag/SnO$_2$, Ag/Li$_2$O, Ag/CoO, Ag/CuO, Ag/Fe$_2$O$_3$, Ag/MnO$_2$, Ag/CaO, CuO/CdO and CuO/ZnO could be readily produced in powder form by the method according to the invention using mixed nitrate solutions of the constituent materials in the desired proportions.

The precipitating medium into which the atomised droplets of the mixed nitrate solution is sprayed can be provided by a solution of at least one of the materials potassium carbonate (K$_2$CO$_3$), potassium bicarbonate (KHCO$_3$), potassium hydroxide (KOH), sodium carbonate (Na$_2$CO$_3$), sodium bicarbonate (NaHCO$_3$) and sodium hydroxide (NaOH) to a concentration of 100 to 300 gm per liter, these precipitating media being maintained at a temperature in the range 0° to 90° C during the chemical reaction with the mixed nitrate solutions.

In general, the precipitate which results from the chemical reaction between the sprayed mixed nitrate solution and the precipitating medium, is firstly suction filtered using, for example Whatman No. 50 filter paper, and then washed using distilled water.

The damp "cake" of the filtered and washed precipitate is then made into a slurry with distilled water and then again filtered and washed in the manner indicated in the preceding paragraph.

The re-filtered and washed precipitate is then dried, for example, in a wind oven at a temperature of 60° C.

The dried powder is then sieved to remove the powder particles which are of a size greater than about 53 microns.

The sieved powder is then decomposed by being heated in air at a temperature of about 500° C for a period of about 1½ hours.

The composite powdered material which results from the decomposition step is then sieved to remove the powder particles which are of a size greater than about 150 microns.

The powder is then made into a slurry with distilled water and then again filtered, washed, dried, fired and sieved in the manner indicated in preceding paragraphs.

By modification of the washing and firing treatments predetermined quantities of the potassium and/or sodium contamination resulting from the chemical reaction may be left in the powder as a ternary or quaternary addition.

If a relatively small Li$_2$O addition is required for the composition of the composite powdered material, the composite powdered material produced in the foregoing manner can be impregnated with lithium nitrate and then fired at an elevated temperature, or lithium nitrate may be added in the desired concentration to the mixed nitrate solution prior to the spraying operation.

In a method of producing a silver-10 weight per cent cadmium oxide composite material in powder form, the first steps involve the formation of an intimately mixed nitrate solution from 628 grams per litre of AgNO$_3$ and 106 grams per litre of Cd(NO$_3$)$_2$4H$_2$O in distilled water, and the formation of a potassium carbonate solution using 230 grams per litre of K$_2$CO$_3$ is distilled water.

In the next step, 60 ccs of the mixed nitrates solution is sprayed into 600 ccs of the potassium carbonate solution at a gas pressure of about 2 pounds per square inch using about 5.0 litres per minute of a nitrogen carrier gas, the potassium carbonate solution being maintained at a temperature of about 19° C. The chemical reaction which occurs as a result of this step is as follows:

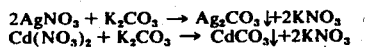

The atomised droplets of the sprayed mixed nitrates solution may have a geometric mean size of about 20 microns and it is important to ensure that a large excess of carbonate is present.

The precipitate of this chemical reaction which is canary yellow in colour, is then filtered, washed and fired et cetera in the manner outlined in preceding paragraphs.

The resulting silver-cadmium oxide powder particles are spherical in form, have a geometric mean diameter of about 0.9 µm and contain 90 weight per cent Ag, 10 weight per cent CdO and a potassium contamination level of 40 ppm.

A silver-30 weight per cent cadmium oxide powder can be produced utilising the process conditions and procedures outlined in the preceding paragraphs by reacting an intimately mixed nitrate solution of 510 gm per litre of AgNO$_3$, 330 gm per litre of Cd(NO$_3$)$_2$ 4H$_2$O and distilled water with a potassium bicarbonate solution containing 188 gm per litre of KHCO$_3$ and distilled water, the potassium bicarbonate solution being maintained at a temperature of about 20° C The resulting silver-30 weight per cent cadmium oxide powder particles are spherical in form, have a geometric means diameter of about 0.9 µm and a potassium contamination level of 40 ppm.

A silver-7.84 weight per cent zinc oxide powder can be produced by reacting an intimately mixed nitrate solution of 605 gm per litre of AgNO$_3$, 105 gm per litre of Zn(NO$_3$)$_2$ 4H$_2$O and distilled water with a potassium carbonate solution containing distilled water and 230 gm per litre of K$_2$Co$_3$. The precipitate of this chemical reaction is filtered, washed and fired et cetera in the manner outlined in preceding paragraphs.

A silver-9.54 weight per cent tin oxide powder can be produced by reacting a silver/tin solution with a potassium carbonate solution containing distilled water, and 230 gm per litre of K$_2$CO$_3$, the silver/tin solution being formed by dissolving 1.88 gm of tin in 180 ccs of H$_2$O and 20 ccs of concentrated nitric acid, adding 35.6 gm of AgNO$_3$ in 100 ccs/H$_2$O to the tin solution followed by the addition of concentrated nitric acid, adding 35.6 gm of AgNO$_3$ in 100 ccs/H$_2$O to the tin solution followed by the addition of concentrated nitric acid until the solution clears. The precipitate of this chemical reaction is filtered, washed and fired et cetera in the manner outlined in preceding paragraphs.

A silver-2.0 weight per cent MgO powder can be produced by reacting an intimately mixed nitrate solution of 712 gm per litre of AgNO$_3$, 58 gm per litre of Mg(NO$_3$)$_3$6H$_2$O and distilled water with a potassium carbonate solution containing distilled water and 230 gm per litre of K$_2$CO$_3$.

The precipitate of this chemical reaction is filtered, washed and fired et cetera in the manner outlined in preceding paragraphs.

Since each of the oxides has been formed on and/or within the particles of the composite powder, the oxide and the silver content of each particle is in the form of an intimate and uniform mixture.

A metal oxide/metal oxide composite powdered material can be produced by reacting an intimately mixed nitrate solution of the desired amounts of the metal oxides with any one of the precipitating media outlined in a preceding paragraph, the precipitate of this chemical reaction being filtered, washed and fired et cetera in the manner outlined in preceding paragraphs.

Thus, in a method of producing a CuO/CdO composite powdered material, the first step involved intimately mixing 38.8. gm of copper nitrate $(Cu(NO_3)_2 3H_2O)$ with 2.0 gm of cadmium nitrate $(Cd(NO_3)_2 4H_2O)$ and distilled water to provide 50 ccs of a mixed nitrate solution. This mixed nitrate solution is then sprayed into 750 ccs of a precipitating medium containing 139.0 gm of potassium carbonate and distilled water. The resulting mixed carbonate precipitate is then filtered, washed and fired et cetera in the manner outlined in preceding paragraphs to provide a CuO/CdO composite powdered material containing 93.8 weight per cent of CuO and 6.2 weight per cent of CdO.

A CuO/ZnO composite powdered material is produced by reacting 150 ccs of a mixed nitrate solution containing 38.8 gm of $Cu(NO_3)_2 3H_2O$, 12.1 gm of zinc oxide $(Zn(NO_3)_2 6H_2O$ and distilled water, with 750 ccs of a precipitating medium containing 139.0 gm of potassium bicarbonate and distilled water. The resulting precipitate is then filtered, washed and fired et cetera in the manner outlined in preceding paragraphs to provide a CuO/ZnO composite powdered material containing 95.5 weight per cent of CuO and 4.5 weight per cent of ZnO.

It should be noted that the composition and physical properties of the silver based powdered materials produced by the methods outlined in the preceding paragraphs can quite readily be varied by variation of the composition and concentration of the mixed nitrates solution and the concentration of the precipitating medium and by variation of the means droplet size of the atomised spray.

It should further be noted that whilst in the method outlined in preceding paragraphs a chemical reaction i.e. precipitation of carbonates, is used, for example, to convert intimately mixed silver and cadmium compounds in solution to intimately mixed silver and cadmium carbonate compounds in the solid state which are subsequently thermally decomposed to give silver-cadmium oxide powder, the atomised spray of mixed nitrates solution could be thermally decomposed in a single step to yield a silvermetal oxide powder having a desired composition and physical properties. With this decomposition process, the atomised mixed nitrates solution is decomposed by being passed through a gas flame, hot air or any other heating method wherein a reaction zone is maintained at a temperature above the decomposition temperatures of the constituent nitrates i.e. a temperature of 550° C in the case of the silver and cadmium nitrates. The silver-metal oxide powder after being produced by thermal decomposition is then cooled and collected in any convenient manner.

The powdered materials produced by the methods outlined in preceding paragraphs whilst having a use in various applications have, in some instances, a particular application in the fabrication of electrical contacts and in the formulations of pastes and inks for use in screen printing or related techniques.

When used inthe fabrication of electrical contact materials, the powder or powders are pressed, sintered and then coined in a known manner to produce dense, solid piece-parts. The microstructure of electrical contact materials produced from the silver-cadmium oxide composite powders consists of a particularly fine, even dispersion of cadmium oxide particles in a silver matrix and thereby makes the electrical contacts formed by, or produced from, this material especially suitable for use in all medium-to-heavy duty switching applications.

The powdered materials produced by the method according to the invention are very much finer than have hitherto been produced by known methods and these powdered materials thereby enable much thinner "thick" films to be produced when they are used in screening pastes and inks.

The methods outlined inpreceding paragraphs have distinct advantages in relation to other powder production methods in that fewer processing steps are required, the processing steps are relatively easy to carry out, the raw materials are not restricted to special grades of say silver and cadmium oxide as they are with comparable powder production methods and the methods provide greater versatility with regard to the composition range of the oxide constituent, the range of alternative oxides that can be used and the possibility of incorporating other materials, such as mercury, to give further beneficial characteristics to the composite material.

It will be readily appreciated by persons skilled in the art that other powdered materials can be produced by the methods according to the present invention and that these powdered materials may also find application in the fabrication of electrical contacts, in the formulation of pastes and inks and in a variety of other applications.

It is to be understood that the foregoing description of specific examples of this invention is made by way of example only and is not to be considered as a limitation in its scope.

What is claimed is:

1. A process of producing a powdered material comprising forming a first solution containing a member selected from the group consisting of (1) at least one chemical compound having a metal atom selected from the group consisting of gold, silver, palladium, and platinum in its molecular structure and being capable of being reduced to yield the free metal and (2) at least one chemical compound having metal and oxygen atoms in its molecular structure and being capable of being reacted to yield a free metal oxide; converting the formed first solution into an atomised spray; and chemically reacting the atomised spray with a second solution of a reducing agent selected from the group consisting of ferrous sulphate, ammonium formate, formic acid, hydroquinone, and oxalic acid, to produce a metal or metal oxide powder having a particle size which is determined by the composition of the first solution in relation to the size of the individual droplets of the atomised spray.

2. The process of claim 1 wherein the first solution is in the form of a nitrate solution, the size of the resulting powder particles being determined by the nitrate concentration and the radius of the atomised droplets.

3. The process of claim 1 wherein the first solution is simultaneously formed into individual droplets and reacted to produce a powdered material by spraying the reducing agent into the said solution.

4. The process of claim 1 wherein the first solution contains gold metal in combination with at least one metal selected from the group consisting of platinum and palladium dissolved in the desired proportions in aqua regia, and wherein the reducing agent is maintained at a temperature of about 90° C and comprises a solution containing at least one member selected from the group consisting of hydroquinone and formic acid.

5. The process of claim 1 wherein the first solution comprises gold and another metal selected from the group consisting of tungsten, silver and nickel.

6. The process of claim 1 wherein the individual droplets of the atomised spray are of a size in the range $<1 \mu m$ to $<100 \mu m$.

7. The process of claim 1 wherein the first solution comprises a member selected from the group consisting of gold metal, chloroauric acid, gold chloride, and cyanoauric acid dissolved in a suitable solvent.

8. The process of claim 7 wherein the first solution comprises a gold solution containing 68 gm of chloroauric acid per liter, wherein the reducing agent is a solution containing 100 gm of ferrous sulphate per litre, wherein the ferrous sulphate solution is maintained at a temperature of 15° C and a pH value of 4.5, wherein the chloroauric acid solution is sprayed into the ferrous sulphate solution at a gas pressure of about 2 pounds per square inch using about 6 litres per minute of a nitrogen carrier gas, wherein the atomised droplets have a geometric mean diameter of about 14 microns, and wherein the resulting powder is washed and then dried.

9. The process of claim 7 wherein the first solution is a gold solution containing not more than 1130 gm of gold per litre of solution.

10. The process of claim 9 wherein the reducing agent is a solution containing 100 to 200 gm of ferrous sulphate per litre of solution and is maintained at a temperature in the range 10° to 50° C and a pH value in the range 1 to 6.

11. The process of claim 9 wherein the reducing agent is maintained at a temperature of about 90° C and comprises a solution of a member selected from the group consisting of hydroquinone in a concentration of 100 gm per litre of solution and oxalic acid in a concentration of 250 gm per litre of solution.

12. The process of claim 1 wherein the first solution comprises a silver nitrate solution.

13. The process of claim 12 wherein the silver nitrate solution comprises 301.6 gm of silver per litre of solution, wherein the reducing agent is ammonium formate containing 240 ccs of ammonium hydroxide, 196 ccs of formic acid and 554 ccs of distilled water, and wherein the atomised droplets have a geometric mean diameter of about 20 $\mu m$.

14. The process of claim 1 wherein the first solution comprises a member selected from the group consisting of palladium metal, palladium chloride and palladium nitrate dissolved in a suitable solvent.

15. The process of claim 14 wherein the first solution comprises a palladium nitrate solution and wherein the reducing agent is a solution of ammonium formate.

16. The process of claim 14 wherein the reducing agent is maintained at a temperature of about 90° C, and is selected from the group consisting of hydroquinone and oxalic acid, wherein the atomised droplets have a geometric means radius of about 20 $\mu m$, and wherein the size of the resulting powder particles is determined by the concentration of the sprayed solution and the radius of the atomised droplets.

17. The process of claim 14 wherein the first solution comprises a palladium solution containing 247 gm of palladium metal per liter of solution dissolved in aqua regia, and wherein the reducing agent contains 100 gm of hydroquinone per liter of solution.

18. The process of claim 14 wherein the first solution comprises an intimate mixture of a desired amount of palladium metal dissolved in nitric acid, silver nitrate and distilled water, and wherein the reducing agent comprises a solution of ammonium formate.

19. The process of claim 1 wherein the first solution comprises platinum dissolved in aqua regia.

20. The process of claim 19 wherein the reducing agent is hot formic acid.

21. The process of claim 1 wherein the first solution contains at least one chemical compound having metal and oxygen atoms in its molecular structure in addition to the other components of the first solution.

22. A process of producing a powdered material comprising forming a first solution containing a member selected from the group consisting of (1) at least one chemical compound having a metal atom in its molecular structure and being capable of being reduced to yield the free metal and (2) at least one chemical compound having metal and oxygen atoms in its molecular structure and being capable of being reacted to yield a free metal oxide; converting the formed first solution into an atomised spray; and chemically and thermally reacting the atomised spray with a second solution of a hot organic liquid medium selected from the group consisting of glycerol, dibutyl phthalate, tetraethylene glycol, and ethyl pentachloro benzene maintained at a temperature higher than the decomposition temperature of the first solution to produce a metal or metal oxide powder having a particle size which is determined by the composition of the first solution in relation to the size of the individual droplets of the atomised spray.

23. The process of claim 22 wherein the first solution comprises a gold solution containing 80 gm of chloroauric acid per liter, wherein the hot organic liquid medium is a solution containing glycerol and is maintained at a temperature in the range 210 to 220° C, wherein the chloroauric acid solution is sprayed into the glycerol solution at a gas pressure of about 1.5 pounds per square inch using about 10 liters per minute of a nitrogen carrier gas, and wherein the atomised droplets have a geometric mean diameter of about 15 microns.

24. The process of claim 22 wherein the first solution comprises a gold solution containing 2,200 gm of chloroauric acid per liter, wherein the hot organic liquid medium is a solution containing glycerol and is maintained at a temperature of about 170° C, wherein the chloroauric acid solution is sprayed into the glycerol solution at a gas pressure of about 10 pounds per square inch using about 3.2 liters per minute of a nitrogen carrier gas, and wherein the atomised droplets have a geometric means diameter of about 15 microns.

25. The process of claim 22 wherein the organic liquid medium is glycerol, and wherein the powder particles produced are in the form of smooth spheres when the glycerol solution is maintained at a temperature in the range of 210° to 220° C and in the form of smooth spheres and hexagonal and triangular platelets when the glycerol solution is maintained at a temperature of about 170° C.

26. A process of producing a powdered material comprising forming a first solution containing a member selected from the group consisting of (1) at least one chemical compound having a metal atom in its molecular structure and being capable of being reduced to yield the free metal and (2) at least one chemical compound having metal and oxygen atoms in its molecular structure and being capable of being reacted to yield free metal oxide; converting the formed solution into an atomised spray; and chemically reacting the atomised spray with a second solution of a precipitating medium selected from the group consisting of potassium carbonate, potassium bicarbonate, potassium hydroxide, sodium carbonate, sodium bicarbonate, and sodium hydroxide to provide a precipitate, and subjecting the precipitate, at least once, to filtering, washing, drying and firing operations to produce a metal or metal oxide powder having a particle size which is determined by the composition of the first solution in relation to the size of the individual droplets of the atomised spray.

27. The process of claim 26 wherein the first solution comprises $Cd(NO_3)_2.4H_2O$ and $AgNO_3$ in distilled water and the precipitating medium is potassium bicarbonate solution.

28. The process of claim 26 wherein the first solution comprises $AgNO_3$ and $Zn(NO_3)_2.6H_2O$ in distilled water and the precipitating medium is potassium carbonate.

29. The process of claim 26 wherein the first solution comprises $Cu(NO_3)_2.3H_2O$, $Cd(NO_3)_2.4H_2O$, and $Zn(NO_3)_2.6H_2O$ in distilled water, and the precipitating medium is potassium bicarbonate solution.

30. The process of claim 26 wherein the first solution comprises a nitrate solution of a desired composition, and wherein the atomised spray is subjected to said chemical reaction by being sprayed into the precipitating medium.

31. The process of claim 30 wherein the precipitating medium comprises a solution of at least one member selected from the group consisting of potassium carbonate, potassium bicarbonate, potassium hydroxide, sodium carbonate, sodium bicarbonate, and sodium hydroxide in a concentration of 100 to 300 gm per liter of solution, the precipitating medium being maintained at a temperature in the range 0° to 90° C.

32. The process of claim 31 wherein the nitrate solution comprises copper nitrate and the nitrate of a metal oxide selected from the group consisting of cadmium oxide and zinc oxide, wherein the nitrate solution comprises 50 ccs of an intimate mixture of 38.8 gm per liter of $Cu(NO_3)_2.3H_2O$, distilled water, and a nitrate selected from the group consisting of $Cd(NO_3)_2.4H_2O$ in a concentration of 2.0 gm per liter and $Zn(NO_3)_2.6H_2O$ in a concentration of 2.1 gm per liter, and wherein the precipitating medium comprises a potassium bicarbonate solution containing 139 gm of $KHCO_3$ per liter of solution and distilled water.

33. The process of claim 31 wherein the nitrate solution comprises silver nitrate and a nitrate of at least one metal oxide, the maximum concentration of the silver nitrate being 712 gm per liter of solution.

34. The process of claim 33 wherein the said at least one metal oxide is cadmium oxide, wherein the nitrate solution comprises an intimate mixture of 628 gm per liter of $AgNO_3$ and 106 gm of $Cd(NO_3)_2.4H_2O$ in distilled water, wherein the precipitating medium comprises a solution of potassium carbonate containing 230 gm per liter of $K_2CO_3$ in distilled water which is maintained at a temperature of 19° C, wherein 60 ccs of the mixed nitrate solution is sprayed into the potassium carbonate solution at a gas pressure of about 2 pounds per square inch using about 10 liters per minute of a nitrogen carrier gas, wherein the atomised droplets have a geometric mean diameter of about 20 microns, and wherein the resulting powdered material contains 10 weight percent of cadmium oxide.

35. The process of claim 33 wherein the said at least one metal oxide is cadmium oxide, wherein the nitrate solution comprises an intimate mixture of 510 gm per liter of $AgNO_3$, 330 gm per liter of $Cd(NO_3)_2.4H_2O$ and distilled water, wherein the precipitating medium comprises a potassium bicarbonate solution containing 188 gm of $KHCO_3$ per liter of solution and distilled water which is maintained at a temperature of 20° C, wherein the mixed nitrate solution is sprayed into the potassium bicarbonate solution at a gas pressure of about 2 pounds per square inch using about 10 liters per minute of a nitrogen carrier gas, wherein the atomised droplets have a geometric means diameter of about 20 microns, and wherein the resulting powdered material contains 30 weight percent of cadmium oxide.

36. The process of claim 33 wherein the said at least one metal oxide is a member selected from the group consisting of zinc oxide, tin oxide and magnesium oxide, and wherein the precipitating medium comprises a potassium carbonate containing 230 gm of $K_2CO_3$ per liter of solution and distilled water.

37. The process of claim 36 wherein the nitrate solution comprises an intimate mixture of 1.88 gm of tin in 180 ccs of $H_2O$ and 20 ccs of concentrated nitric acid, 35.6 gm of $AgNO_3$ in 100 ccs of $H_2O$ and concentrated nitric acid, the nitric acid being added to clear the solution, and wherein the resulting powdered material contains 9.54 weight percent of tin oxide.

38. The process of claim 36 wherein the nitrate solution comprises an intimate mixture of 712 gm per liter of $AgNO_3$, 58 gm per liter of $Mg(NO_3)_2.6H_2O$ and distilled water, and wherein the resulting powdered material contains 2.0 weight percent of magnesium oxide.

39. The process of claim 36 wherein the nitrate solution comprises an intimate mixture of 605 gm per liter of $AgNO_3$, 105 gm per liter of $Zn(NO_3)_2.4H_2O$ and distilled water, and wherein the resulting powdered material contains 7.84 weight percent of zinc oxide.

40. The process of claim 33 wherein the said at least one metal oxide is cadmium oxide, wherein another metal oxide is included, the nitrate of the said another metal oxide being either added to the mixed nitrate solution prior to the chemical reaction, or impregnated into the resulting powdered material which is then fired at an elevated temperature.

* * * * *